June 17, 1930.  A. F. MASURY ET AL  1,765,088
CONTROL FOR DIRECT CURRENT GENERATORS
Filed Nov. 28, 1927
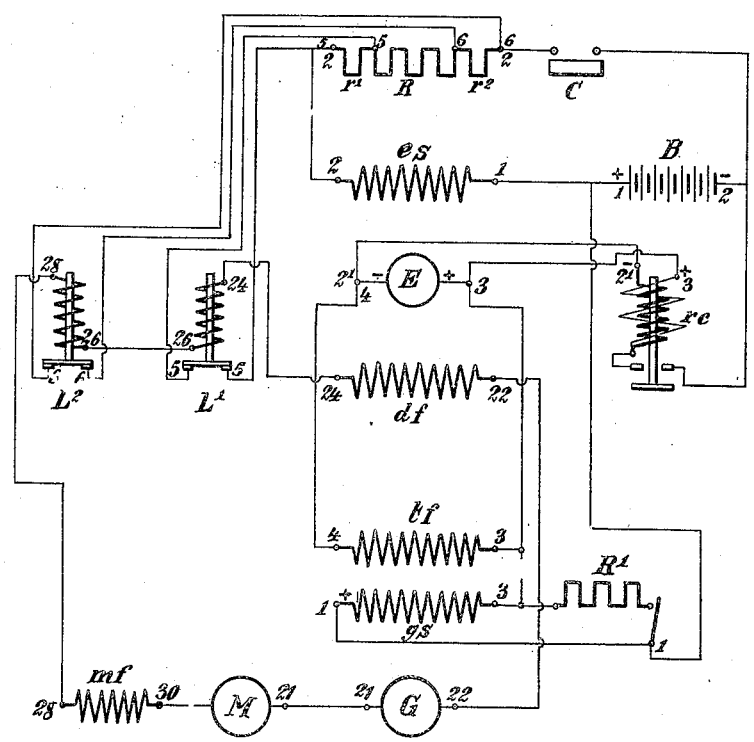
Inventor:
Alfred F. Masury, Frank E. Queeney, William B. Jupp
By their attorneys
Redding, Greeley, O'Shea & Campbell Patented June 17, 1930

1,765,088

UNITED STATES PATENT OFFICE

ALFRED F. MASURY AND WILLIAM B. JUPP, OF NEW YORK, N. Y., AND FRANK E. QUEENEY, OF TEANECK, NEW JERSEY, ASSIGNORS TO INTERNATIONAL MOTOR COMPANY, OF NEW YORK, N. Y., A CORPORATION OF DELAWARE

CONTROL FOR DIRECT-CURRENT GENERATORS

Application filed November 28, 1927. Serial No. 236,058.

The present invention relates to the control of a direct current generator to produce a given characteristic of current output and is of particular importance in connection with generators which are driven by an internal combustion engine in driving a vehicle.

More specifically, the invention deals with the current control of a generator which supplies current to a motor for driving a vehicle. It has been found that during the accelerating period of the vehicle, the generator loads up faster than the engine power increases. This reduces the maximum acceleration of the vehicle. After the acceleration period has passed, the engine power increases more rapidly than the generator loads up.

An object of this invention is to provide an automatic means for controlling the pick-up of the generator to cause it to agree with that of the engine, thus obtaining the highest possible acceleration.

It is contemplated to provide an improved construction of the above character for controlling a direct current generator, the fields of which are excited by a differentially wound exciter, by means of varying the excitation of the separately excited shunt field. In carrying out the above object, a resistance is inserted in the shunt field of the exciter and is varied by contactors operated upon predetermined current flow to the driving motor. During acceleration, resistance is inserted in the field to reduce the pick-up, and when the power developed is greater than that necessary for driving the vehicle, resistance is cut out, increasing the generator load, or producing the same load at a lower engine speed.

Further objects will appear as the description proceeds and reference will now be had, for a more detailed description of the invention, to the accompanying drawing, forming a part hereof, wherein the single figure shows a preferred form of the invention including a means for varying the resistance in the exciter field by means of series contactors operated by the flow of current through the driving motor.

Referring to the drawing accompanying this specification, G is a suitable generator for driving motor M which serves to drive a vehicle in any manner. The motor is connected in circuit with the generator by means of line 21, line 30, motor field $mf$, line 28, series contactor $L^2$, line 26, series contactor $L^1$, line 24, exciter differential field $df$ and line 22. The generator separately excited field $gs$ is connected through line 1 with the positive terminal of battery B and with the positive terminal of the exciter through line 3. A resistance $R'$ may be provided in parallel with the field $gs$ to change the charging rate of the battery. Generator separately excited field winding $tf$ is provided for energizing the generator.

A differentially wound exciter E is connected to energize the generator separately excited field winding $tf$ by means of lines 3 and 4. The separately excited field $e^s$ of the exciter being connected across the battery B through lines 1 and 2. A control drum contact $c$ is connected in this field circuit and serves to control the operation of the mechanism.

In order that the excitation of the exciter may be varied, a resistance R is inserted in the circuit of the separately excited field $es$. Portions $r'$ and $r^2$ are connected, through lines 5 and 6 respectively, with the series contactors $L'$ and $L^2$ respectively. These contactors are controlled by a predetermined current flow through the generator and motor circuit, both being energized to insert resistance elements $r'$ and $r^2$ in the exciter field circuit due to the heavy current flow in starting and accelerating, but contactor $L^1$ is designed to drop out when the current flow reaches a predetermined value above that of contactor $L^2$. These contactors are so designed that $L'$ drops back and closes the circuit 5 after the accelerating period of the vehicle has been completed. At this time, the generator picks up its load under its own inherent characteristics until the point is reached where the power developed is greater than that called for by the vehicle. At this point, contactor L² drops back to close circuit 6 and cut out resistance element $r^2$. This increases the excitation of the exciter and, correspondingly, the generator shunt field $g\,s$, to enable the generator to assume a greater load, the resistance being so designed that the load thus assumed is in proportion to the capacity of the engine of taking on a greater load.

A reverse current relay $r\,c$ is connected in the line 2 and in circuit with the exciter so that the current through the generator separately excited field flows from the negative side of the battery, through line 2, reverse current relay $r\,c$, line 2' to the negative side of the exciter, through the exciter and line 3, to the shunt field winding $g\,s$, and through line 1, back to the battery B. The reverse current relay $r\,c$ is picked up as the exciter is started, and serves as a protection against a reversal of the current through the separately excited field winding.

The operation of the above system will be apparent from the foregoing description, and it is to be observed, as noted above, that the resistances $r^1$ and $r^2$ are to be designed to cause the excitation of the generator to pick up its load, throughout practically the entire operating range in proportion to the capacity of the engine for assuming greater loads. The contactors L¹ and L² are designed to drop out at the proper points in the power curve of the generator to effect its operation in accordance with the characteristics described above.

We claim as our invention:

In a device including an internal combustion engine, a generator having a separately excited field for supplying power to drive a vehicle, wherein a plurality of resistance elements are selectively inserted in circuit with said field to vary the excitation thereof in successive stages in accordance with the building up, normal running, and increased speed portion of the speed torque curve of an internal combustion engine for driving the generator, an exciter for energizing the separately excited field of the generator, a field winding for the exciter, a source of current for energizing the field winding of the exciter, a plurality of resistance elements, automatic means operated by the generator current to increase the number of resistance elements in the field of the exciter during the acceleration of the vehicle and to decrease the number of resistance elements therein after the accelerating period has ceased, to cause the generator to pick up its load in proportion to that of the engine, and means to decrease the number of resistance elements in the exciter field still further after the power developed is greater than that called for by the vehicle to cause the generator to increase its load in proportion to the ability of the engine to assume an added load.

This specification signed this 23rd day of November A. D. 1927.

ALFRED F. MASURY.
WILLIAM B. JUPP.
FRANK E. QUEENEY.